(12) United States Patent
Kooger et al.

(10) Patent No.: US 11,541,761 B2
(45) Date of Patent: Jan. 3, 2023

(54) SWITCH FOR A TRACK FOR GUIDING TRANSPORTATION OF A VEHICLE

(71) Applicant: Hardt IP B.V., Delft (NL)

(72) Inventors: Bauke Jan Kooger, Rotterdam (NL); Marijn Jesper Geuze, Rotterdam (NL)

(73) Assignee: HARDT IP B.V., Rotterdam (NL)

( * ) Notice: Subject to any disclaimer, the term of this patent is extended or adjusted under 35 U.S.C. 154(b) by 376 days.

(21) Appl. No.: 16/631,988

(22) PCT Filed: Jul. 16, 2018

(86) PCT No.: PCT/NL2018/050489
§ 371 (c)(1),
(2) Date: Jan. 17, 2020

(87) PCT Pub. No.: WO2019/017775
PCT Pub. Date: Jan. 24, 2019

(65) Prior Publication Data
US 2020/0164750 A1    May 28, 2020

(30) Foreign Application Priority Data

Jul. 17, 2017  (NL) .................................... 2019259

(51) Int. Cl.
*B60L 13/00* (2006.01)
*B60L 13/06* (2006.01)
*B61B 13/08* (2006.01)

(52) U.S. Cl.
CPC ............. *B60L 13/003* (2013.01); *B60L 13/06* (2013.01); *B61B 13/08* (2013.01)

(58) Field of Classification Search
CPC ........ B60L 13/003; B60L 13/06; B60L 13/08; B61B 13/08
See application file for complete search history.

(56) References Cited

U.S. PATENT DOCUMENTS 3,845,720 A    11/1974   Bohn et al.
5,655,458 A *   8/1997   Powell .................... B60L 13/06
                                                          104/130.02

(Continued)

FOREIGN PATENT DOCUMENTS

CA          2933654 A1    12/2016
CN        205804057 U    12/2016

(Continued)

OTHER PUBLICATIONS

Written Opinion of the International Searching Authority and International Search Report dated Nov. 23, 2018 issued in corresponding International Patent Application No. PCT/NL2018/050489 (8 pgs.).

(Continued)

*Primary Examiner* — Robert J McGarry, Jr.
(74) *Attorney, Agent, or Firm* — Pillsbury Winthrop Shaw Pittman, LLP (57) ABSTRACT

A switch is presented for a magnetically suspended or at least guided vehicle. The switch comprises a fork from a first track segment to a second and third track segment. An elongate conductive module, for example a conductive wire is provided along at least the first track segment and optionally along the second and third track segment. The conductive module comprises conductor segments that guide a current with a directional component substantially parallel the length of the track, at a first surface of the track. With an electromagnet provided on a carriage having a pole directed to the first surface of the track, a Lorentz force may be provided for urging the carriage in a direction perpendicular to the length of the track. This allows a carriage moving along the first track segment to be urged towards the second or third track segment at the other side of the fork.

23 Claims, 7 Drawing Sheets

(56) References Cited

U.S. PATENT DOCUMENTS

2003/0094115 A1  5/2003  Kim et al.
2010/0199876 A1  8/2010  Wamble

FOREIGN PATENT DOCUMENTS

| | | |
|---|---|---|
| DE | 10357264 A1 | 7/2005 |
| EP | 3109998 A1 | 12/2016 |
| JP | 51-093009 A | 8/1976 |
| JP | 58-020201 B | 4/1983 |
| JP | 59-25901 U | 2/1984 |
| JP | H04-193007 A | 7/1992 |
| JP | H05-37773 U | 5/1993 |
| JP | 10-510698 A | 10/1998 |
| JP | 2001-57712 A | 2/2001 |
| KR | 10-2010-0079019 A | 7/2010 |
| WO | WO-2015036302 A1 * | 3/2015 ............ B60L 13/003 |

OTHER PUBLICATIONS

First Office Action dated Mar. 3, 2021, issued in corresponding Chinese Patent Application No. 201880053271.X with English translation (11 pgs.).

Notice of Reasons for Refusal dated Apr. 5, 2022, issued in corresponding Japanese Patent Application No. 2020-524704 with English translation (12 pgs.).

* cited by examiner

SWITCH FOR A TRACK FOR GUIDING TRANSPORTATION OF A VEHICLE

CROSS-REFERENCE TO RELATED APPLICATIONS

This application is the U.S. National Stage of PCT/NL2018/050489, filed Jul. 16, 2018, which claims priority to: Netherlands Patent Application No. 2019259, filed Jul. 17, 2017, the entire contents of each of which are herein incorporated by reference in their entireties.

TECHNICAL FIELD

The various aspects relate to a switch for a track for guiding a magnetically suspended and/or magnetically guided vehicle.

BACKGROUND

Magnetically suspended vehicles are available for a longer time, for example between Shanghai Pu Dong Airport and the Pu Dong suburb of Shanghai. The carriages are suspended on the track by means of a magnetic force. The carriages are guided by a single rail, provided with linear motors on either side that interact with magnets provided at the bottom of the carriages. For switching tracks, mechanic switches are provided that make a mechanical movement between two track segments for defining a trajectory for the vehicles.

SUMMARY

It is preferred to provide a switch for a magnetically suspended vehicle that does not require moving parts of the switch in the track for effectuating the switching functionality from a first track segment to one of two or more track segments.

A first aspect provides a switch for a track for guiding transportation of a vehicle along the track. The switch comprises a first elongate track segment, a second elongate track segment and a third elongate track segment. The switch further comprises a track selection module for selecting between a first guidance mode in which the vehicle is guided from the first track segment to the second track segment and a second guidance mode in which the vehicle is guided from the first track segment to the third track segment. In the switch, the track segments comprise a ferromagnetic material; and the track selection module comprises a first elongate electrical conductor having first conductor segments that are located at a first surface at a vehicle side of the track which first conductor segments have a directional component parallel to the length of the track segments.

In conventional magnetic levitation trains, the windings provided at the ferromagnetic rail are substantially perpendicular to the intended direction of movement for propelling carriages by means of the Lorentz force, perpendicular to the current through the conductors and perpendicular to a magnetic field. By providing conductors parallel to the length of the track, a sideway movement may be effectuated, by means of which the switching functionality may be provided.

In an embodiment, the first conductor comprises second conductor segments located away from the first surface and the first conductor segments and the second conductor segments of the first conductor are alternated.

This embodiment allows a continuous conductor to be used for implementing this aspect; by having the conductor meander from on the surface, where it is arranged to interact with magnets of a carriage guided by the track, to off the surface, where it does not interact with or interacts much less with the magnets of the carriage, a practical implementation can be provided.

In another embodiment, the second conductor segments of the first conductor are located in substantially the same plane as the first surface, at a distance from the first track segment at a first side of the first track segment.

This embodiment mitigates the need for perforating the track segment to lead the conductor away from the first surface. And if the second conductor segments are provided away from the track segment, no ferromagnetic material is in the direct vicinity of the second conductor segments for providing a strong magnetic field.

A further embodiment of the switch comprises a second elongate conductor alternately comprising first conductor segments and second conductor segments. In this embodiment, the first conductor segments of the second conductor are provided at the first surface, the first conductor segment having a directional component parallel to the length of the track segments and the second conductor segments of the second conductor are located away from the first surface and the second conductor segments of the first conductor. This embodiment provides redundancy.

In again another embodiment, the first conductor continues from first track segment to second track segment and second conductor continues from first track segment to third track segment.

This allows for continued guidance and control and, optionally, propulsion of a carriage along the track and the switch, including providing the switching action. It is noted the first conductor and the second conductor are not necessarily to be considered as one physical conductor, but as a functional conductor that may be comprise multiple physical conductor modules that may be jointly or separately controlled. Yet, the conductor modules are together controlled as one functional conductor providing control to guidance of the carriage and for switching the trajectory of the carriage to the second track segment or the third track segment—or from the third or second track segment to the first track segment. It may even be envisaged the second conductor in not available on the first track segment, but only on the third track segment.

In again a further embodiment, the first conductor and the second conductor comprise third conductor segments for connecting the first conductor segments to the second conductor segments, the first conductor segments are substantially parallel to the length of the track segments; and the third conductor segments are substantially perpendicular to the length of the track segments. The third track segments may be controlled for propelling a carriage along the track.

In yet another embodiment, the first conductor further comprises second conductor segments provided at the first surface, the second conductor segments having a directional component substantially parallel to the first conductor segments and arranged to direct the current through the conductor in a direction substantially opposite to direction of the current through the first conductor segment.

This embodiment preferably works in conjunction with a carriage with a magnet having two or three poles spaces apart such that a first pole is arranged to interact with the first conductor segment and the second pole, of polarity opposite to that of the first pole, is arranged to interact with the second conductor segment.

In yet a further embodiment the first conductor comprises a multitude of loops, the first conductor segments are provided between the loops; and the second conductor segment are provided as part of the loops.

This embodiment provides an example of a practical implementation of this embodiment.

In another embodiment, the second track segment and the third track segment are connected to the first track segment in extension of the first track segment, the second track segment and the third track segment diverge and the first conductor segments and the second conductor segments are provided on the first track segment. Such switch is able to provide fast switching action, while the carriage has a significant speed.

A second aspect provides a transportation system for guiding a vehicle comprising a substantially closed conduit arranged to be brought at a pressure of less than 0.1 bar; and a track provided in the conduit, the track comprising a switch according to the first aspect.

A third aspect provides a carriage arranged for transport along a track comprising a switch according to the first aspect, the carriage comprising a first magnet having a north pole and a south pole provided at a distance from one another, wherein the magnetic field lines at the north pole and the south pole are substantially parallel to one another and substantially perpendicular to the intended direction of transportation of the vehicle.

BRIEF DESCRIPTION OF THE DRAWINGS

The various aspects and embodiment will now be discussed in further detail in conjunction with drawings. In the drawings.

FIG. 2 A: shows a side view of a track segment with a conductor provided in loops;

FIG. 2 B: shows an isometric view of a track segment with a conductor provided in loops;

FIG. 7 A: shows a first top view of a track segment with meandered conductors;

FIG. 7 B: shows a second top view of a track segment with meandered conductors;

DETAILED DESCRIPTION

Figure 1:
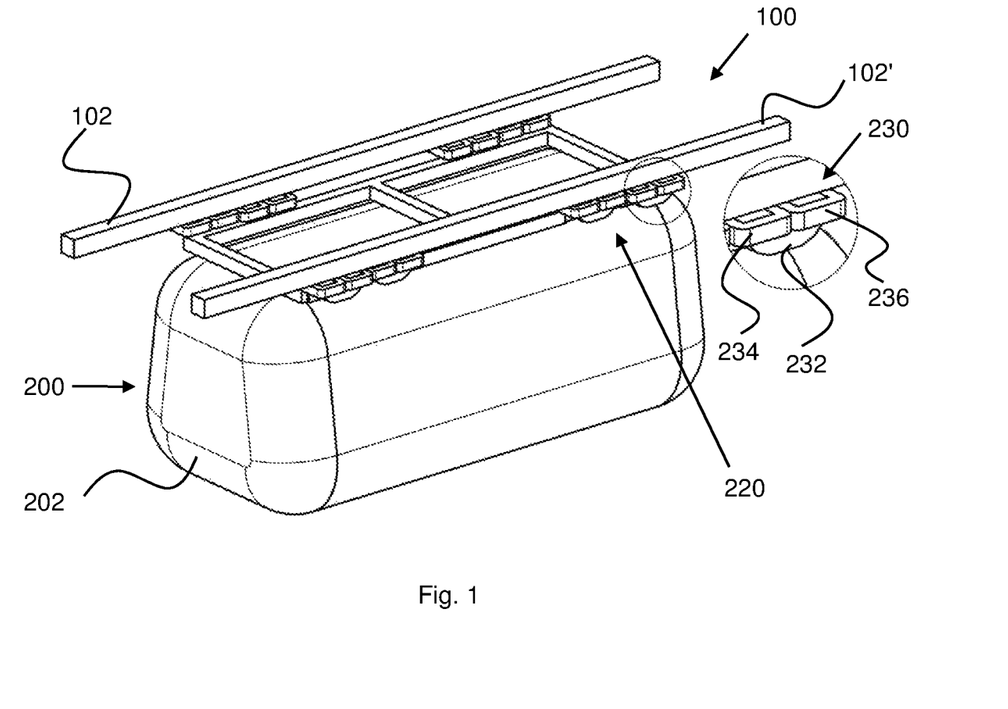
FIG. 1: shows a carriage magnetically suspended from a track segment.

FIG. 1 shows a carriage 200 comprising a payload module 202 for carrying goods, people or a combination thereof. The carriage 200 is suspended from a first track segment 100 comprising a first rail 102 and a second rail 102'. The first rail 102 and the second rail 102' comprise ferromagnetic material and preferably predominantly comprise iron, for example in the form of steel having iron as a majority ingredient. In this embodiment, the first track segment 100 comprises two rails, though embodiments comprising one or more than two rails may be envisaged as well.

In the embodiments shown in most of the description, the tracks or track segments comprise two parallel rails, each with its own one or more windings—or conductors—for exciting an electromagnetic force. In other embodiments, the tracks or track segments may comprise one rail only along which the vehicle or carriage is guided. Alternatively, a track may comprise more than two rails. Of these three or more rails, one or more may be provided without windings—preferably in a symmetrical way. In one other embodiment, one main rail may be provided with the track, with two parallel conductors provided as sub-rails on the main rail for guiding the vehicle. Referring to the embodiment as depicted by FIG. 1, this may main that the first rail 102 and the second rail 102' are provided as part of one larger rail, for example a centre rail.

At the top of the carriage 200, magnetic suspension modules 220 are connected to the payload module 202 by means of a frame. In this embodiment, a magnetic suspension module 220 is provided at each corner of the carriage 200. Each magnetic suspension module 220 comprises at least one and preferably two electromagnets 230. The electromagnet 230 comprises a core 232 around which a first coil 234 and a second coil 236 are provided. The coils are arranged to be powered by means of an electric current. With a current running through one or both coils, the electromagnet 230 is powered for providing a suspension force for suspending the carriage 200 from the first track segment by means of a magnetic force.

The core 232 of the electromagnet 230 is curved over an angle of 180°, such that both poles are substantially in the same plane. Depending on how the first coil 234 and the second coil 236 are provided with a current, the end of the core 232 around which the first coil 234 is provided may be a north pole or a south pole. The end of the core 232 around which the second coil 236 is provided will have a polarity opposite to that of the first end.

Whereas the electromagnet 230 is shown having a U-shape with coils wound around both legs, other types and shapes of magnets may be used as well in combination with any of the options shown in the embodiments discussed here.

Additionally or alternatively to electromagnets, also permanent magnets may be used. With respect to the electromagnets, different shapes may be used. Whereas such embodiment is not preferred in view of stray of the magnetic field, a single core, with a single substantially straight leg, may be used.

In another embodiment, an electromagnet is provided having an e-shaped core with the legs directed towards the track. Of the legs, one, two or three may be provided with windings for providing an electromagnetic field. Due care is in such embodiment to be taken that the windings are provided and powered such that the summed magnetic field in the outer legs has a magnitude of the magnetic field in the middle leg. Preferably, the magnetic field in the outer legs is the same for each leg.

Figure 2:
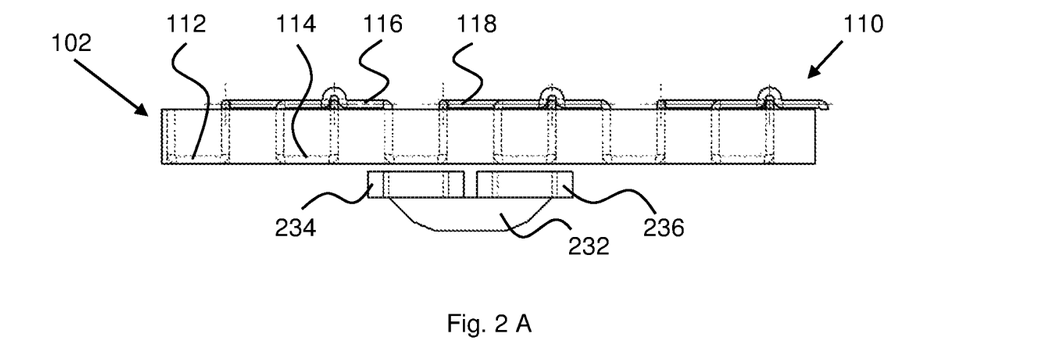

FIG. 2 A shows the first rail 102 in further detail. The first rail comprises a first conductor 110 running substantially parallel along the first rail 102 and provided in a body 104 of the first rail. The first conductor comprises first conductor segments 112 and second conductor segments 114. The first conductor segments 112 and second conductor segments 114 have substantially the same length. Furthermore, in one embodiment and the embodiment shown in particular, the first conductor segments 112 and the second conductor segments 114 have a length substantially the same as the length of the core 232, as shown by FIG. 2 A.

The first conductor segments 112 and the second conductor segments 114 are provided at one and the same side of the body 104. In this embodiment, the carriage 200 is suspended below the track by means of an electromagnetic force exerted by the electromagnets 230 provided on the carriage. The first conductor segments 112 and the second conductor segments 114 are provided for adjusting the position of the electromagnets 230 and with that, of the carriage 200, relative to the track in a direction perpendicular to the direction of the track, in the plane of the track. To this purpose, the first conductor segments 112 and the second conductor segments 114 are provided at the bottom surface of the rail body 104, at the surface facing the electromagnets 230. At the surface may indicate that the first conductor segments 112 and the second conductor segments 114 lie on top of the surface or are fully or partially embedded in the surface.

The first conductor segments 112 and the second conductor segments 114 are arranged such that with a current being provided through the first conductor 110, the current through the first conductor segments 112 is—from a spatial point of view—opposite to the current through the second conductor segments 114. To achieve this, the first conductor 110 is provided in the body 104 in loops. The second conductor segments 114 are provided in the loops and the first conductor segments 112 are provided between the loops.

The first conductor segments 112 and the second conductor segments 114 are spaced apart such that the distance between the ends of the core 232 and in particular the centres thereof is substantially the same as the distance between the first conductor segment 112 and the second conductor segment 114 and in particular the centres thereof. In this way, if the pole with the first coil 234 is located at a first conductor segment 112, the pole with the second coil 236 is located at a second conductor segment 114. And if the pole with the first coil 234 is located at a second conductor segment 114, the pole with the second coil 236 is located at a first conductor segment 112. Worded differently, the spatial periodicity of the first conductor 110 corresponds to the distance between the poles of the electromagnet. The distance between the poles does not define the period: the actual period L is longer and runs from the start of one first conductor segment 112 to the start of a directly adjacent first conductor segment 112.

Figure 3:
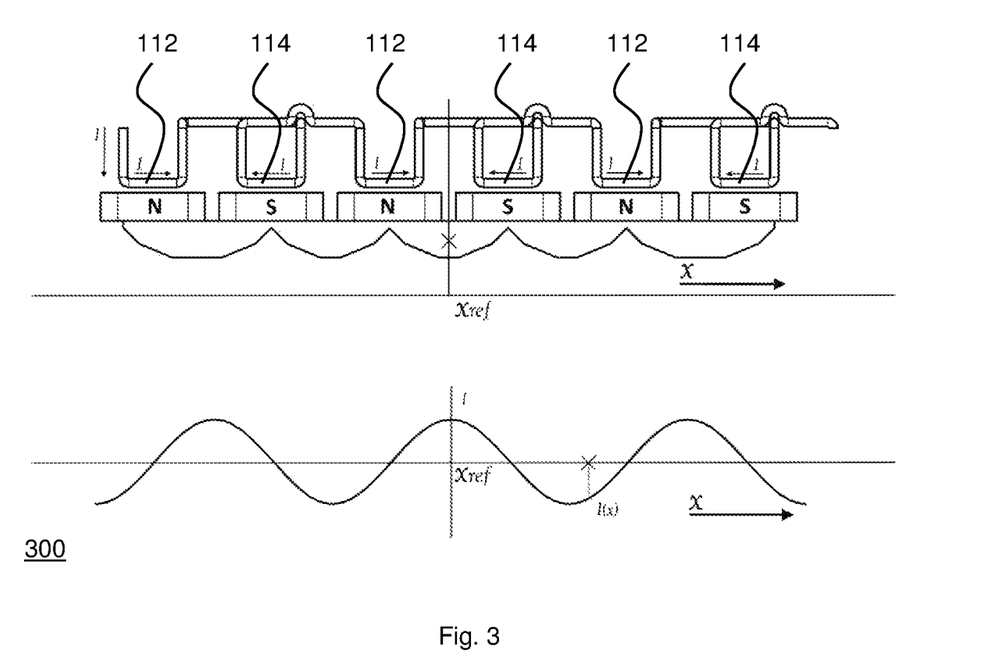
FIG. 3: shows a schematic side view of a current signal provided to a conductor.

FIG. 3 shows an isometric view of the first rail 102, showing a multitude of conductors 110 in parallel. In this particular embodiment, the various line segments of the conductors 110 are aligned. FIG. 3 also shows third conductor segments 116 of which distal parts are connected to distal parts of the second segments 114 and proximal parts are connected to distal parts of the first conductor segments 112. Furthermore, FIG. 3 shows fourth conductor segments 118 of which distal parts are connected to proximal parts of the first segments 112 and proximal parts are connected to proximal parts of the second conductor segments 114. In this way, loops are constituted in the conductors 110.

The third conductor segments 116 and the fourth conductor segments 118 are provided at a surface of the rail body 104 that is opposite to the side at which the first conductor segments 112 and the second conductor segments 114 are provided.

As discussed, the rail 102 of the first track segment 110 thus provided is arranged to provide a force to the electromagnet 230, thus resulting in a movement of the carriage 200 relative to the track in a direction perpendicular to the direction of the track, in the plane of the track. This force, the Lorentz Force, is proportional to the outer product of the current vector and the magnetic field. With the magnetic field at the interface of the rail body 104 and the first conductor segments on one hand and the poles of the electromagnet 230 on the other hand being substantially perpendicular to one another, the Lorentz force is, with FIG. 2 A as reference, in a direction perpendicular to the plane of the image.

Figure 4:
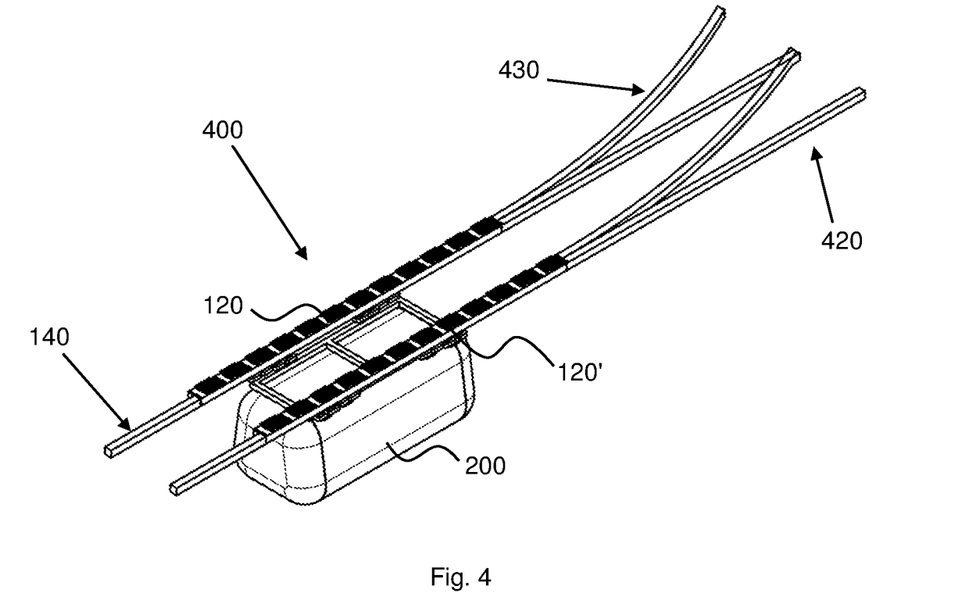
FIG. 4: shows a first switch for switching a trajectory of a magnetically suspended carriage.

FIG. 4 shows a first graph 300 indicating the current through the first conductor 110 as a function of the position of a reference point on the electromagnet 230 relative to the first conductor 110. In this embodiment, the carriage 200 travels along the first track segment 100 with a speed v, having a component $v_{par}$ parallel to the first rail 102 and parallel to the first conductor 110 having a spatial periodicity L. To ensure smooth movement of the carriage 200 relative to the first track segment, the current in the first conductor 100 is to be an alternating current. This is important, as each conductor segment is firstly passed by a first pole of the electromagnet 230 having a first polarity and subsequently by a second pole of the electromagnet 230 having a second opposite polarity. If the current through the first conductor would not alternate, alternating (electromechanical) Lorentz force would be applied to the carriage, with a uncomfortable ride of the passengers as a consequence.

To ensure smooth movement, the frequency of the alternating current I through the first conductor 110 is dependent on the speed of the carriage relative to the first rail 102. Preferably, the current is provided as follows:

$$\alpha I = \sin(2\pi(t/T) - c)$$

with $T = L/v_{par}$ with α being a constant defining the maximum current, t being time, T being the period of the signal and the time period during which the electromagnet 230 travel the period of the first conductor 110, v being the speed of the carriage and c being a constant such that a maximum current is provided when either the first pole or the second pole of the electromagnet 230 passes the first conductor segment 112.

FIG. 4 shows a switch 400 for switching direction of travel of the carriage 200 from a first track segment 410 to either a second track segment 420 or a third track segment 430. The carriage 200 is propelled along a track comprising the first track segment 140, the second track segment 420 and the third track segment 430. This may be effectuated by means of a further conductor wincing provided along the rails of the track. At the junction between the first track segment 410 on one hand and the second track segment 420 and the third track segment 430 on the other hand, a first switching rail 120 and a second switching rail 120' are provided in the track, in parallel to one another. If the track is constituted by means of only one rail, only one switching rail is provided.

The first switching rail 120 and the second switching rail 120' comprising a multitude of conductors as depicted by FIG. 2 B. the conductors of the first switching rail 120 and the second switching rail 120' are powered as discussed above in conjunction with FIG. 3. By virtue of powering the conductors 110 in the first switching rail 120 and the second switching rail 120', the carriage 200 is moved to the left of the first track segment 410 or to the right of the first track segment 410, depending on what direction the current flows at the moment a particular pole passes a particular segment of the conductor 110 provided at a surface of the switching rail 120 and the second switching rail 120' facing the electromagnet 230 of the carriage 200.

With the switch 400, the second track segment 420 overlaps the third track segment 430. More in particular, the left rail of the second track segment 420 overlaps with the right rail of the third track segment 430. The switch is operated such that edges of the carriage 200 are moved to the left or to the rights side of the first switching rail 120 and the second switching rail 120'. Once at the intended side, the carriage 200 is controlled to deep the carriage 200 at the intended side of the first switching rail 120 and the second switching rail 120' to follow its course from the first track segment 410 to either the second track segment 420 or the third track segment 430.

Figure 5:
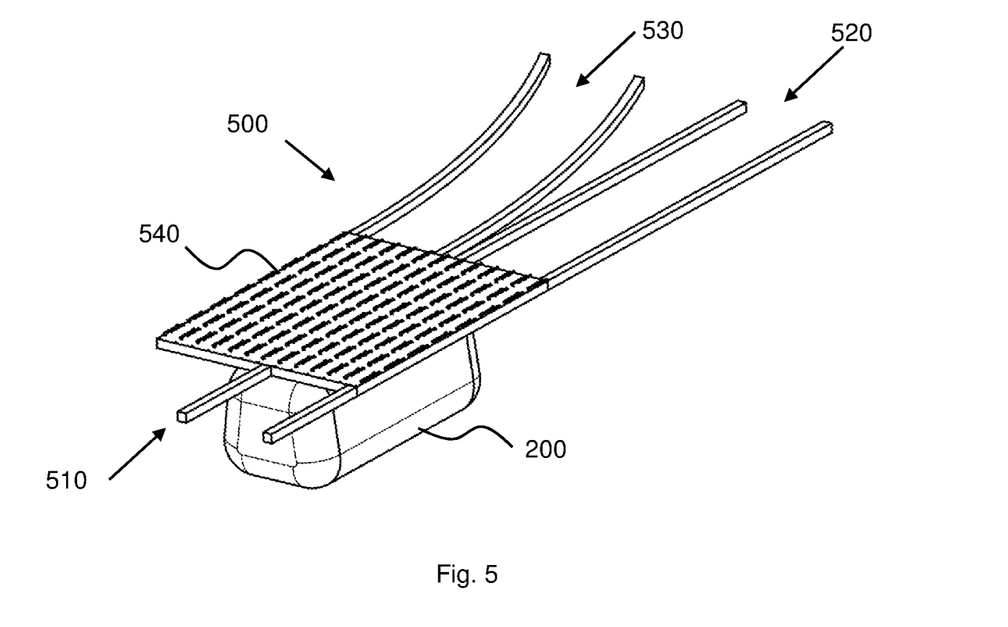
FIG. 5: shows a second switch for switching a trajectory of a magnetically suspended carriage.

FIG. 5 shows another switch 500, providing switching functionality from a first track segment 510 to either a second track segment 520 or a third track segment 530 in which the second track segment 520 does not overlap with the third track segment. In the switch 500, a switching block 540 is provided having conductors 110 arranged thereon as depicted by FIG. 2 B. During travelling of the carriage 200 along the switching block 540, the conductors 110 are powered by a current as discussed above to enable a sideway movement of the carriage relative to the switching block 540 if the carriage 200 is to continue traveling along the track via the third track segment 530. If, on the other hand, the carriage 200 is to continue along the track via the second track segment 520, the conductors 110 are preferably not powered to enable the carriage 200 to continue in a substantially straight line.

Figure 6:
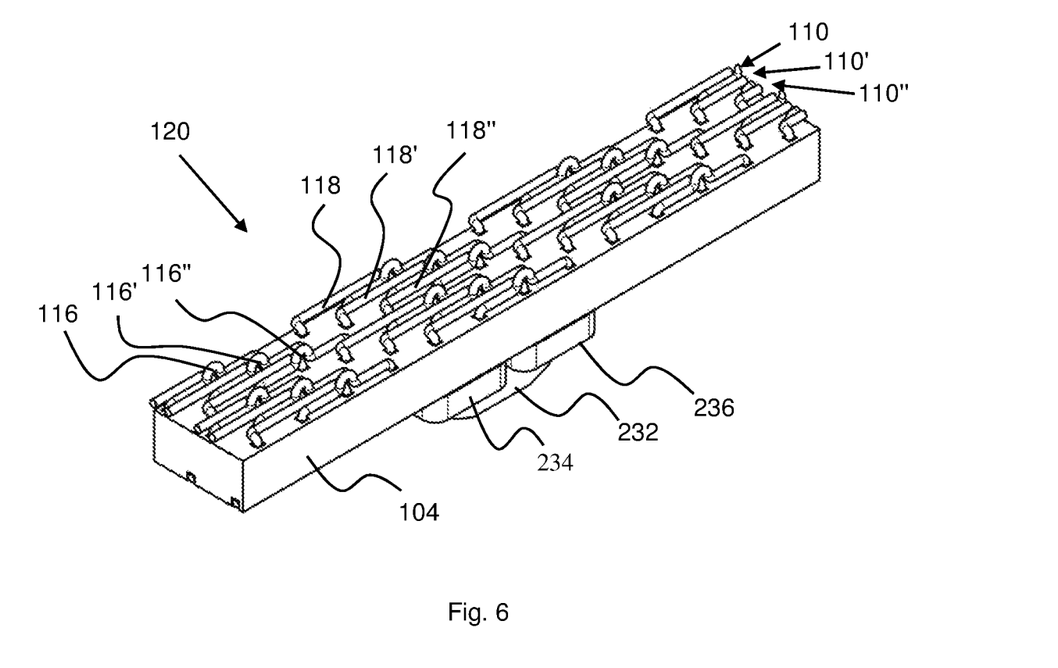
FIG. 6: shows an isometric view of a track segment with a conductor provided in loops for three-phase control.

So far, a one-phase system has been discussed for providing a force to enable the carriage 200 to switch track segments. FIG. 6 shows a further switching segment 120 arranged to be powered by a three-phase current. The switching segment 120 comprises groups of three conductors, a first phase conductor 110, a second phase conductor 110' and a third phase conductor 110". In this embodiment, the three phase conductors are shifted relative to one another by a sixth of a spatial period of the windings. In another embodiment, the three phase conductors are shifted relative to one another by a third of a spatial period of the windings. In the latter embodiment, the phases of the switching currents through the conductors are skewed by a third of a period. In the first embodiment, the phases of the switching currents through the conductors are skewed by a sixth of a period.

Figure 7:
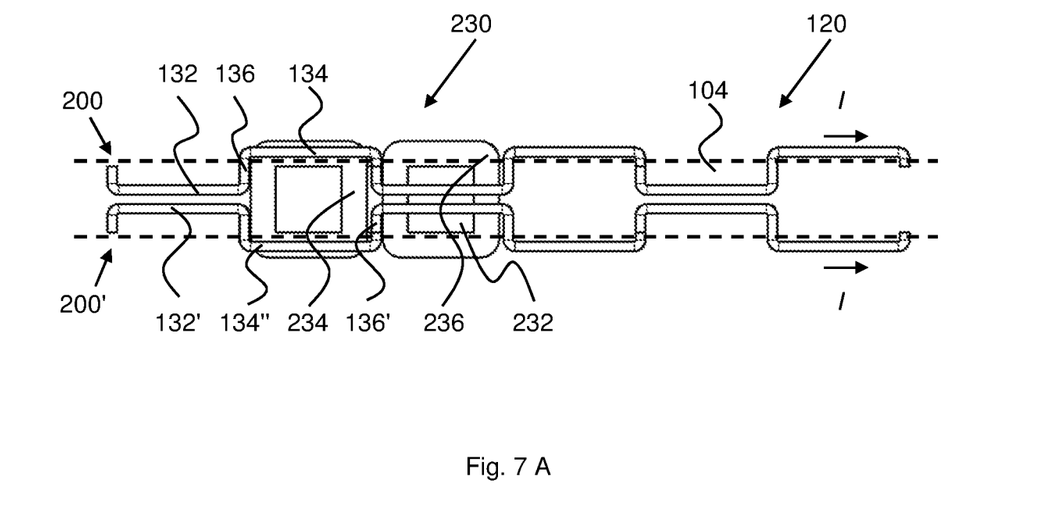

FIG. 7 A shows another embodiment of a rail segment 102 arranged to enable the carriage 130 to switch from one track segment to another track segment. The rail segment 102 comprises a rail body 104. At one surface of the rail body 104, either fully or partially embedded at the surface or on the surface, a first conductor 130 and a second conductor 130' are provided. The first conductor 130 and the second conductor 130' are preferably provided in one plane that substantially coincides with the surface at which the conductors are provided. Relative to the electromagnets provided on the carriage 130, this is the surface of the rail body 104 that faces the carriage.

The first conductor 130 and the second conductor 130' have a meandering shape, with first segments 132 of the first conductor 130 and first segments 132' of the second conductor 130' provided at the surface of the rail body 104 and second segments 134 of the first conductor 130 and second segments 134' of the second conductor 130' being provided away from the rail body 104. With the rail body 104 predominantly comprising a ferromagnetic metal like iron, as discussed before, only the field generated by the first conductor segments benefits from the ferromagnetic characteristics of the rail body 104.

FIG. 7 A also shows the electromagnet 230. With the position of the electromagnet 230 as depicted by FIG. 7 A, the pole surrounded by the second coil 236 is under the influence of the first conductor segment 132 of the first conductor 130 and of the first conductor segment 132' of the second conductor 130'. As the second segments 134 of the first conductor 130 and the second segments 134' of the second conductor 130' are located away from the ferromagnetic rail body 104, the influence of the magnetic field generated by these second conductor segments 134 on the pole with the first coil 234 is negligible relative to the effect of the magnetic field generated by the first conductor segments 132.

With the first coil 234 and the second coil 236 being provided with a direct current, the first conductor 130 and the second conductor 130' are preferably provided with an alternating current. The frequency of the alternating current is calculated in the same way as discussed above:

$$\alpha I = \sin(2\pi(t/T) - c)$$

with T=L/υ with α being a constant defining the maximum current, t being time, T being the period of the signal and the time period during which the electromagnet 230 travel the period L of the conductors 220, being the speed of the carriage and c being a constant such that a maximum current is provided when either the first pole or the second pole of the electromagnet 230 passes the first conductor segment 132.

Depending on the direction of the current through the conductors—from left to right or opposite—, a force to the left or the right—in the drawing: up or down—is exerted on the electromagnet 230 and therefore on the carriage 130. The force exerted is the Lorentz force and can be calculated accordingly. That is, if the centre of the core 232 coincides with centres of the first conductor segments.

FIG. 7 B shows the position of the electromagnet 230 slightly shifted relative to the conductor segments. In the configuration as depicted by FIG. 7 B, poles of the electromagnet are positioned at the third conductor segments 136 of the first conductor 130 and third conductor segments 136' of the second conductor 130'. At this position, the current in the conductors flows perpendicular to the length of the track segment and the traveling direction of the carriage 200. And provided current flows in the first conductor 130 and the second conductor 130' in the same direction along the track, the currents in the first conductor 130 and the second conductor 130' are now at the locations of the poles flowing in opposite directions. This may result in unwanted electromechanical effects. Two option are available to address this effect.

Firstly, the current signals are provided in accordance with the formula provided above. This means that if centres of the poles coincide with the third track segments, the current through the conductors is zero. Second, if the position of a centre of a pole coincides with the third conductor segments, the currents in the third conductor segments 136 of the first conductor 130 and third conductor segments 136' of the second conductor 130' are provided such that they are provided in the same direction. As an effect, they exert a force on the electromagnet 230 and hence, on the carriage 200 in a direction substantially parallel to the travelling direction of the carriage 200 and/or the length of the track—either in the direction of travel or opposite thereto.

By virtue of this effect, the embodiment of the rail segment as shown by FIG. 7 A and FIG. 7 B may be used for switching functionality as well as for propulsion functionality. This, in turn, means that no further windings are required on the rails for propelling the carriage 200 along the track. It is noted that this embodiment required control of the currents different from control as provided by means of the formula provided above.

Figure 8:
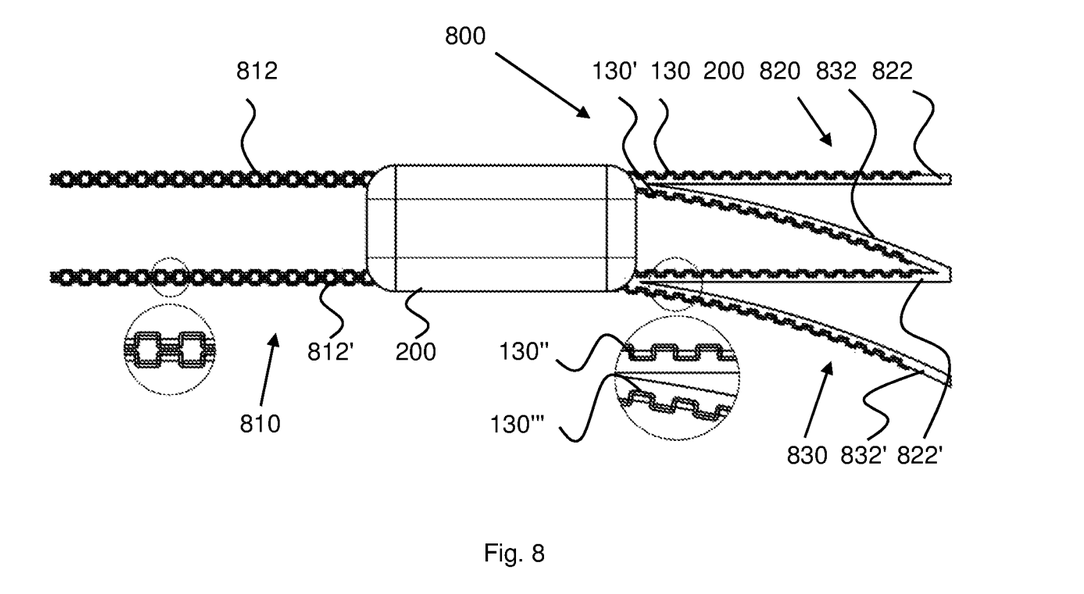
FIG. 8: shows a third switch for switching a trajectory of a magnetically suspended carriage.

FIG. 8 shows a switch 800 provided in a track for the carriage 200. The switch 800 is provided for switching direction of the carriage 200 from a first track segment 810 to one of a second track segment 820 and a third track segment 830. The first track segment 810 comprises a first rail 812 and a second rail 812', the second track segment 820 comprises a first rail 822 and a second rail 822' and the third track segment 830 comprises a first rail 832 and a second rail 832'.

On the first rail 812 of the first track segment 810, the first conductor 130 and the second conductor 130' are provided. In an equivalent way, the second rail 812' of the first track segment 810 is provided with a third conductor 130" and a fourth conductor 130'". The first conductor 130 continues from the first rail 812 of the first track segment 810 to the first rail 822 of the second track segment. The second conductor 130' continues from the first rail 812 of the first track segment 810 to the first rail 832 of the third track segment 830. The third conductor 130" continues from the second rail 812' of the first track segment 810 to the second rail 822' of the second track segment 820. And the fourth conductor 130'" continues from the second rail 812' of the first track segment 810 to the second rail 832' of the third track segment 830.

It is noted that in this, but also in other embodiment, the conductors are not necessarily one physical conductor. Additionally or alternatively, the conductors may be provided by means of multiple modules, either connected by means of, for example, ohmic contacts, or electrically isolated. Yet, it is preferred the conductor modules form one functional conductor that is arranged to provide the switching functionality as discussed above.

Figure 9:
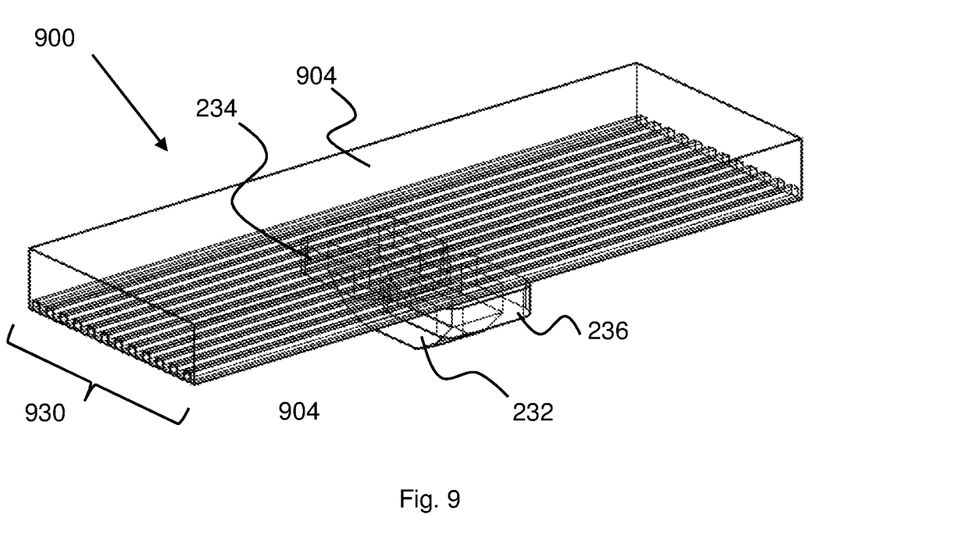
FIG. 9: shows a switching module for a track comprising conductor continuously provided at an interface surface.
Figure 10:
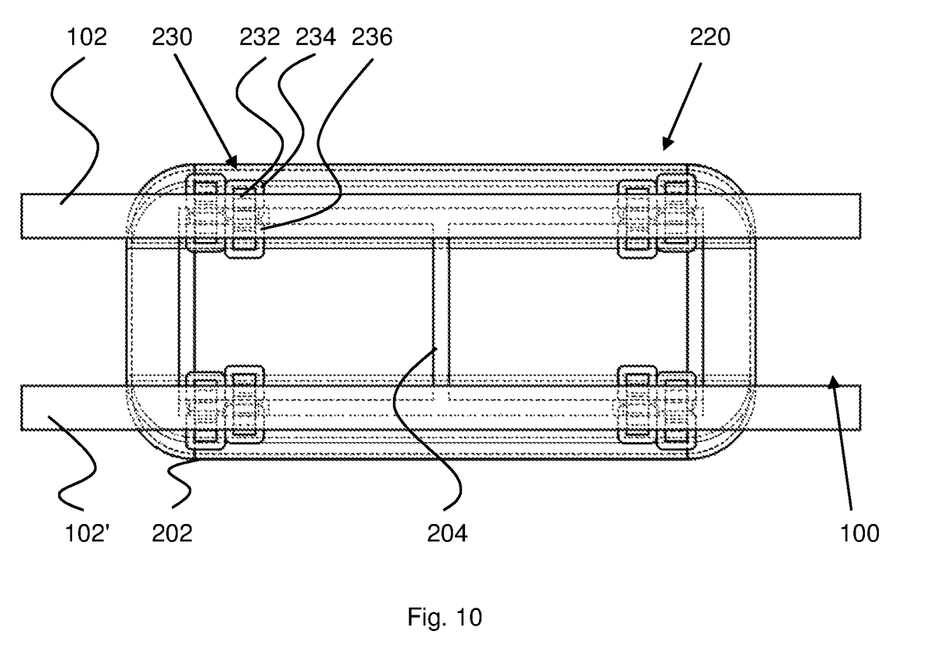
FIG. 10: shows a top view of a carriage for operation with the switching module shown by FIG. 9.

FIG. 9 shows yet another embodiment of a switching module 900 that may be incorporated in a switch. Rather than the conductors 930 being intermittently provided at the interface surface of the module body 900 at the interface with the electromagnet 230, the conductors 930 are provided at the surface in a continuous fashion, substantially parallel to the length of the track and the intended direction of the carriage 200. This requires an orientation of the electromagnet 230 relative to the track different than depicted in FIG. 1. This is depicted in FIG. 9 and FIG. 10.

Rather than the poles being provided in a line substantially parallel to the track length and the intended direction of movement, the poles are provided on a line substantially perpendicular to the track length and the intended direction of movement. FIG. 10 shows this in further detail, in a top view from the carriage 200 and a first track segment 100. For position control of the carriage 200 relative to the track, magnetic suspension modules 220 are provided at each corner of the payload module by means of a frame 204. Each magnetic suspension module 220 comprises at least one and preferably two electromagnets 230. If the magnetic suspension module 220 comprises two electromagnets 230, they are slightly skewed relatively to one another in over the line through the two poles. The electromagnet 230 comprises a core 232 around which a first coil 234 and a second coil 236 are provided. The coils are arranged to be powered by means of an electric current. With a current running through one or both coils, the electromagnet 230 is powered.

Also from a control point of view, the embodiment shown by FIG. 9 requires the conductors to be powered in another way. In the embodiment shown by FIG. 2 A and FIG. 2 B a substantially constant sine shape current signal is to be provided—provided the carriage travels at continuous forward velocity. For the amount of sideway movement, only the intensity of the current is to be controlled. On the other hand, the configuration as shown by FIG. 9 requires switching of currents per conductors, at a frequency depending on the transversal movement speed of the carriage 200 relative to the switching module 900 as shown by FIG. 9.

As discussed, the embodiments discussed above may be combined with additional windings that are provided for propulsion of the carriage 200. Such windings comprise first segments provided at the carriage interface surface of the rail or the rails of the track, substantially perpendicular to the length of the track. These first windings are connected by means of second segments that may be provided parallel to the length of the rails and that are provided away from the rails to ensure the magnetic field induced by the second segments is significantly less than the magnetic induced by the first segments. Such windings may be provided in single mode, in three-phase mode as discussed above or in another configuration.

Thus far, embodiments have been disclosed with a carriage suspended from the track. The various aspects and further characteristics thereof may also be employed in other embodiment in which the carriage is provided above the tracks. In such embodiment, depicted by FIG. 11, the carriages rolls over the track 100 by means of wheels 292. The wheels 292 do not have substantial extensions that reach beyond the main diameter of the wheels 292 to enable switching to other track segments at a switch only by controlling the electromagnetic functionality of the switches.

Figure 11:
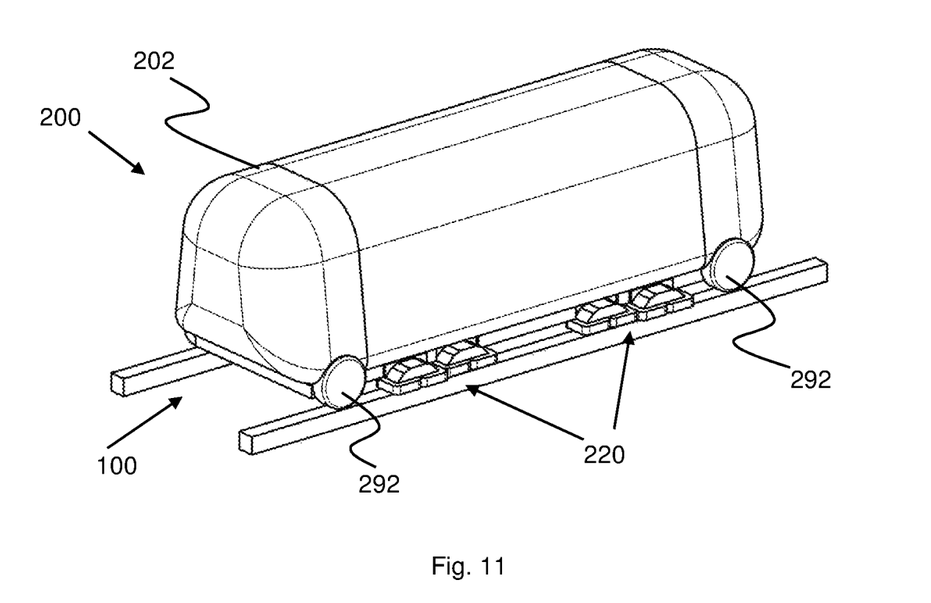
FIG. 11: shows another carriage comprising wheels for carrying the carriage on a track.

In another embodiment, the carriage 200 is provided above the track 100 and the magnetic suspension modules 220 are provided below the track 100. In such embodiments, overlapping rails in a switch are omitted. This means that with four magnetic suspension modules 220 provided on the carriage 200, the carriage 200 is in such switches suspended by only three magnetic suspension modules 220.

In summary, the various aspects relate to a switch is presented for a magnetically suspended or at least guided vehicle. The switch comprises a fork from a first track segment to a second and third track segment. An elongate conductive module, for example a conductive wire is provided along at least the first track segment and optionally along the second and third track segment. The conductive module comprises conductor segments that guide a current with a directional component substantially parallel the length of the track, at a first surface of the track. With an electromagnet provided on a carriage having a pole directed to the first surface of the track, a Lorentz force may be provided for urging the carriage in a direction perpendicular to the length of the track. This allows a carriage moving along the first track segment to be urged towards the second or third track segment at the other side of the fork.

The embodiments discussed thus far are discussed in conjunction with conductor segments having a directional component parallel to the length of the tracks in general and the rails in particular. These conductor segments are discussed for guiding the vehicle to a particular position on the track selection module, towards one or two or more tracks of the switch. If these conductor segments are provided perpendicular to the length of the track, the conductor segments may be used for determining the position of the vehicle on the track in a direction perpendicular to the length of the track and, hence, perpendicular to the main direction of movement of the vehicle along the track.

If these conductor segments are provided diagonally relative to the length of the track, the conductor segments may be used for establishing displacement of the vehicle relative to the rails in a direction parallel to the track as well as perpendicular to the track—in any case substantially perpendicular to the length of the conductor segments.

Whereas this embodiment may be advantageous from a material and therefore cost point of view, it is not a preferred embodiment. In a preferred embodiment, the amount and speed of displacement perpendicular to the length of the track and parallel to the track, along the track, may be controlled independent from one another. Therefore, an embodiment comprising conductor segments substantially parallel to the tracks and the rails in particular on one hand and further conductor segments substantially perpendicular to the tracks and the rails in particular on the other hand is particularly preferred. With the conductor segments and the independent conductor segments being powered independently, this embodiment allows for independent forward and sideway speed and displacement control.

In the description above, it will be understood that when an element such as layer, region or substrate is referred to as being "on" or "onto" another element, the element is either directly on the other element, or intervening elements may also be present. Also, it will be understood that the values given in the description above, are given by way of example and that other values may be possible and/or may be strived for.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

It is to be noted that the figures are only schematic representations of embodiments of the invention that are given by way of non-limiting examples. For the purpose of clarity and a concise description, features are described herein as part of the same or separate embodiments, however, it will be appreciated that the scope of the invention may include embodiments having combinations of all or some of the features described. The word 'comprising' does not exclude the presence of other features or steps than those listed in a claim. Furthermore, the words 'a' and 'an' shall not be construed as limited to 'only one', but instead are used to mean 'at least one', and do not exclude a plurality.

A person skilled in the art will readily appreciate that various parameters and values thereof disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A switch for a track for guiding transportation of a vehicle along the track, the switch comprising:
A first elongate track segment;
A second elongate track segment;
A third elongate track segment;
A track selection module for selecting between a first guidance mode in which the vehicle is guided from the first track segment to the second track segment and a second guidance mode in which the vehicle is guided from the first track segment to the third track segment;
Wherein:
each of the first, second, and third elongate track segments comprise a ferromagnetic material; and
the track selection module comprises a first elongate electrical conductor having first conductor segments that are arranged to guide a current through the first elongate electrical conductor, the current having a directional component substantially parallel to the length of the track located at a first surface of the track at a vehicle side of the track which said first conductor segments are connected to provide a continuous elongate conductor and have a directional component parallel to a length of each of the first, second, and third elongate track segments.

2. The switch according to claim 1, wherein the first elongate electrical conductor comprises second conductor segments located away from the first surface and the first conductor segments and the second conductor segments of the first elongate electrical conductor are alternated.

3. The switch according to claim 2, wherein the second conductor segments of the first elongate electrical conductor are located in substantially the same plane as the first surface, at a distance from the first track segment at a first side of the first track segment.

4. The switch according to claim 3, further comprising a second elongate electrical conductor alternately comprising first conductor segments and second conductor segments, wherein:
The first conductor segments of the second elongate electrical conductor are provided at the first surface, the first conductor segments having a directional component parallel to the length of each of the first, second, and third track segments; and
The second conductor segments of the second elongate electrical conductor are located away from the first surface and the second conductor segments of the first elongate electrical conductor.

5. The switch according to claim 4, wherein the first conductor segments of the first elongate electrical conductor are parallel to the first conductor segments of the second elongate electrical conductor, and wherein the second conductor segments of the first elongate electrical conductor are parallel to the second conductor segments of the second conductor.

6. The switch according to claim 4, wherein the first elongate electrical conductor continues from the first elongate track segment to the second elongate track segment and the second elongate electrical conductor continues from the first elongate track segment to the third elongate track segment.

7. The switch according to claim 4, wherein:
The first elongate electrical conductor and the second elongate electrical conductor comprise third conductor segments for connecting the first conductor segments to the second conductor segments thereof;
The first conductor segments of each of the first elongate electrical conductor and the second elongate electrical conductor are substantially parallel to the length of each of the first, second, and third elongate track segments; and The third conductor segments of each of the first elongate electrical conductor and the second elongate electrical conductor are substantially perpendicular to the length of each of the first, second, and third elongate track segments.

8. The switch according to claim 4, wherein the second conductor segments are substantially parallel to each of the first, second, and third elongate track segments and the first and second conductor segments have substantially the same lengths.

9. The switch according to claim 7, wherein:
the second track segment and the third track segment are connected to the first track segment in extension of the first track segment;
the second track segment and the third track segment diverge; and
the first elongate electrical conductor is provided on the first track segment and the second track segment and the second elongate electrical conductor is provided on the first track segment and the third track segment.

10. The switch according to claim 1, the first elongate electrical conductor further comprising second conductor segments provided at the first surface, the second conductor segments having a directional component substantially parallel to the first conductor segments and arranged to direct current through the first elongate electrical conductor in a direction substantially opposite to direction of the current through the first conductor segments.

11. The switch according to claim 10, wherein:
the first elongate electrical conductor comprises a multitude of loops;
the first conductor segments are provided between the loops; and
the second conductor segments are provided as part of the loops.

12. The switch according to claim 11, further comprising third conductor segments and fourth conductor segments located away from the first surface, wherein:
distal parts of third conductor segments are connected to distal parts of the second conductor segments and proximal parts of the third conductor segments are connected to distal parts of the first conductor segments; and
distal parts of the fourth conductor segments are connected to proximal parts of the first conductor segments and proximal parts of the fourth conductor segments are connected to proximal parts of the second conductor segments.

13. The switch according to claim 10, wherein the first conductor segments and the second conductor segments are provided substantially in extension of one another in a spatially periodically repeating pattern having a periodic length L.

14. The switch according to claim 13, further comprising:
a second elongate electrical conductor comprising first conductor segments and second conductor segments and shaped similarly as the first elongate electrical conductor; and
a third elongate electrical conductor comprising first conductor segments and second conductor segments and shaped similarly as the first elongate electrical conductor,
Wherein:
the first conductor segments and the second conductor segments of the first elongate electrical conductor, the second elongate electrical conductor and the third elongate electrical conductor have substantially the same length;
the first conductor segments and the second conductor segments of the first elongate electrical conductor are skewed relative to the first conductor segments and the second conductor segments of the second elongate electrical conductor by substantially a third of the period L; and
the first conductor segments and the second conductor segments of the second elongate electrical conductor are skewed relative to the first conductor segments and the second conductor segments of the third elongate electrical conductor by substantially a third of the period L.

15. The switch according to claim 10, wherein:
the second track segment and the third track segment are connected to the first track segment in extension of the first track segment;
the second track segment and the third track segment diverge; and
the first conductor segments and the second conductor segments are provided on the first track segment.

16. The switch according to claim 10, wherein the second track segment does not overlap with the third track segment and the track selection module is provided between the first track segment on a first side of the switch and the second track segment and the third track segment on a second side of the switch opposite to the first side.

17. The switch according to claim 1, further comprising a multitude of further conductor segments provided substantially parallel to one another, the further conductor segments having a directional component substantially parallel to the length of each of the first, second, and third elongate track segments.

18. The switch according to claim 17, wherein the further conductor segments are connected to provide continuous conductors.

19. A transportation system for guiding a vehicle comprising:
a substantially closed conduit arranged to be brought at a pressure of less than 0.9 bar and preferably less than 0.1 bar;
a track provided in the conduit, the track comprising a switch according to claim 1.

20. A carriage arranged for transport along a track comprising a switch according to claim 1, the carriage comprising a first magnet having a north pole and a south pole provided at a distance from one another, wherein magnetic field lines at the north pole and the south pole are substantially parallel to one another and substantially perpendicular to an intended direction of transportation of the vehicle.

21. The carriage according to claim 20, wherein the north pole and the south pole are provided in a line substantially parallel to the intended direction of transportation.

22. The carriage according to claim 21, further comprising a second magnet similarly shaped as the first magnet, the second magnet having a north pole and a south pole, wherein the poles of the second magnet are skewed relative to the poles of the first magnet by less than the distance between the north poles and the south poles perpendicular to the line between the south poles and the north poles.

23. The carriage according to claim 20, further comprising a multitude of further conductor segments provided substantially parallel to one another, the further conductor segments having a directional component substantially parallel to the length of the track segments, wherein the north pole and the south pole are provided in a line substantially perpendicular to the intended direction of transportation.

\* \* \* \* \*